US008418637B2

(12) United States Patent
Gill et al.

(10) Patent No.: US 8,418,637 B2
(45) Date of Patent: Apr. 16, 2013

(54) METHOD OF PLANTING TRIPLOID SEEDLESS WATERMELON SEEDS AND ENHANCED WATERMELON POLLENIZER SEEDS FOR PRODUCING WATERMELON TRANSPLANTS

(75) Inventors: Allen Gill, Boise, ID (US); Craig Mathis, Boise, ID (US); Jim McConnell, Boise, ID (US)

(73) Assignee: Syngenta Participations AG, Basel (CH)

( * ) Notice: Subject to any disclaimer, the term of this patent is extended or adjusted under 35 U.S.C. 154(b) by 0 days.

(21) Appl. No.: 13/101,627

(22) Filed: May 5, 2011

(65) Prior Publication Data

US 2011/0203501 A1    Aug. 25, 2011

Related U.S. Application Data

(62) Division of application No. 12/719,157, filed on Mar. 8, 2010.

(60) Provisional application No. 61/163,921, filed on Mar. 27, 2009.

(51) Int. Cl.
*A01C 15/00* (2006.01)

(52) U.S. Cl.
USPC ............................ 111/200; 111/900; 111/906

(58) Field of Classification Search ............... 800/308, 800/298, 295; 111/200, 900, 906–915
See application file for complete search history.

(56) References Cited

U.S. PATENT DOCUMENTS

| 4,718,363 A | 1/1988 | Williames |
| 5,289,796 A * | 3/1994 | Armstrong ............... 119/52.3 |
| 6,759,576 B2 * | 7/2004 | Zhang et al. ............. 800/308 |
| 7,115,800 B2 * | 10/2006 | Barham et al. .......... 800/308 |

FOREIGN PATENT DOCUMENTS

| AU | 525073 | 10/1982 |
| JP | 2006-25692 | 2/2006 |
| JP | 2008-167673 A * | 7/2008 |

OTHER PUBLICATIONS

Hassell et al., Seedless Watermelon Transplant Production Guidelines, [retrieved from the Internet on Apr. 15, 2010], Mar. 7, 2002.
Freeman et al., Performance of Selected Diploid Watermelon Pollenizers, University of Florida IFAS Extension, [retrieved from the Internet on Apr. 15, 2010], Jan. 2007.
SK Design Drum Seeder, [retrieved from the Internet on Apr. 15, 2010], <http://www.skdesign.inc.com/seeder.htm>, 2006.

* cited by examiner

*Primary Examiner* — Christopher J. Novosad
(74) *Attorney, Agent, or Firm* — Karen Magri; Syngenta Participations AG

(57) ABSTRACT

A method of sowing watermelon seeds is provided, specifically a method for sowing triploid seedless watermelon seeds and enhanced watermelon pollenizer seeds in the same seedling tray through the use of a mechanical seeder.

11 Claims, 2 Drawing Sheets

METHOD OF PLANTING TRIPLOID SEEDLESS WATERMELON SEEDS AND ENHANCED WATERMELON POLLENIZER SEEDS FOR PRODUCING WATERMELON TRANSPLANTS

CROSS-REFERENCE TO RELATED APPLICATIONS

This application is a divisional of U.S. patent application Ser. No. 12/719,157, which claims the benefit of U.S. Provisional Application No. 60/163,921, filed Mar. 27, 2009. Both applications are incorporated herein by reference.

FIELD OF THE INVENTION

This invention is in the field of seedless watermelon production, specifically relating to the planting of enhanced watermelon pollenizers in close proximity to triploid watermelon plants for the production of seedless watermelons.

BACKGROUND OF THE INVENTION

Watermelon is an important specialty crop that is common in all major agriculture production areas and accounts for 2% of the world area devoted to vegetable crops. There were 3,743,497 of hectares of watermelon grown in the world and 55,200 hectares of watermelons grown in the United States in 2006. Asia is by far the most important watermelon production site with nearly ⅔ of the world area and slightly over ⅔ of the world production (United Nations, Food and Agriculture Organization, FAOStat (February 2008)). There were 64,840 hectares of watermelon planted in the USA with a total production of 42,869,000 cwt and farm value of $476,209,000 in 2007 (USDA, NASS, Vegetables Annual Summary (1950-81 and 1992-2007)). California was the leading state in watermelon farm gate value, exceeded $72 million in 2000, due to high percentage of triploid seedless watermelon grown in California. Seedless watermelon receives well above the average price for seeded watermelons in the market. Triploid seedless watermelon also produces higher yields than the diploid seeded watermelons. The significantly increased watermelon productivity and farm value, as well as decreased production acreage, in the USA since the mid-1990s are the result of using triploid seedless watermelon varieties in commercial production.

As with many different plants, watermelon contains a fruit part and a plant part. Each part contains different traits that are desired by consumers and/or growers, including such traits as flavor, texture, disease resistance, and appearance traits such as shape and color. The seedless trait in the watermelon fruit is highly desired by consumers. For production of seedless watermelon, optimum pollination characteristics of the pollenizing plant are desired.

Seedless watermelon plants are triploid and must be pollinated by the pollen of seeded watermelon plants. To provide adequate pollenization of seedless watermelon plants, the recent practice has been to plant pollenizer plants over approximately 25-33% of the field surface. The remaining portion of the field is planted with the triploid seedless watermelon plants. Thus, to maximize the value of the crop in the field, growers used high yield marketable diploid watermelon varieties as pollenizers. These pollenizers ultimately competed with the triploid seedless varieties for sun, nutrients, space, and are also more susceptible to foliar diseases. Diploid seeded varieties mature earlier than triploid seedless varieties, thus requiring harvesting prior to the seedless varieties reaching maturity.

However, the seedless watermelon industry went through a revolutionary change in production practices in 2001 when Syngenta Seeds, Inc. released its enhanced diploid non-harvestable watermelon pollenizer, referred to as "Super Pollenizer", or SP-1. This enhanced watermelon pollenizer is protected by U.S. Pat. No. 6,759,576. (See also U.S. Pat. No. 7,071,374.) This innovative variety employed a novel diploid, non-competitive watermelon plant to improve upon current methods of commercial production of seedless watermelons, increasing the number of triploid seedless plants per acre and thereby increasing seedless watermelon yields per acre. Since that time, other enhanced watermelon pollenizers have come into the market place.

Enhanced watermelon pollenizers like SP-1 have small leaves that allow the pollenizer to be grown in close proximity to the triploid seedless watermelon plants without competing with them, thereby increasing seedless plant populations and yields of seedless fruits. The enhanced watermelon pollenizer has leaves that take up less field area than the substantially larger leaves of the pollenizers used in the past for production of seedless watermelon. Thus, as it is less competitive for light, water and fertilizers, enhanced watermelon pollenizers are grown closer to the triploid watermelon plants, and do not need dedicated space to grow. When enhanced pollenizers are used, the triploid seedless watermelon plants are typically grown in solid rows at a standard spacing, the enhanced watermelon pollenizer being then inter-planted between the plants within the rows. The result is a significantly higher number of triploid watermelon plants per acre compared to the number of triploid watermelon plants that has traditionally been planted, and higher yields of seedless fruits.

Due to germination issues with triploid watermelon seeds, triploid watermelon plants are normally sold as young plants and not as seeds. Because of this, enhanced watermelon pollenizers are often sold as transplants along with the triploid watermelon plants. As an example, Syngenta sells transplants through a transplant business that provides the enhanced watermelon pollenizer SP-1 along with a triploid seedless watermelon variety, both in the form of transplants, or so-called young plants.

The watermelon transplants are produced by commercial vegetable greenhouses located in the regional watermelon production areas to allow for delivery to the grower's field. The commercial greenhouses obtain seed either from growers or suppliers. These transplant producers grow the young plants to meet specific transplanting dates in the field.

Watermelon plants are produced in 30 to 50 $cm^3$ "cell" trays containing a soilless soil mix of 50 to 65% high grade peat and 35 to 50% horticultural vermiculite or horticultural perlite. Some common trays used in watermelon transplanting range from 98, 128, 200 and 242 cells per tray and are composed of various materials such as hard Styrofoam, hard plastic or flexible plastic materials.

Watermelons are placed one seed per cell and sown about 2-cm deep. The planting media is generally pre-watered lightly prior to seeding to bring the seed and mix in contact. Trays are then placed under controlled humidity and temperature for 24-48 hours by covering and placing in a germination chamber at 30-35 C. The trays are then arranged on benches in a greenhouse with day temperature 21-27C and night temperature 18-21C where temperature control can be achieved.

Plants are grown in the greenhouses and ready for transplanting when the roots are sufficiently developed to permit removal from the cell with the entire growing mix volume intact. This will generally require four to six weeks from sowing or seeding, depending on cell size, light and temperature conditions.

Current seeding methods include semi-automated equipment and hand sowing techniques. The largest percentage of commercial watermelon transplant producers use mechanical seeders that are typically based on vacuum technology for precision placement of the seed in the tray cells. The automated process involves filling the trays with planting media which is then moved under a "punch or dibble" allowing for the proper depth and insures positioning of the seed in the center of the cell.

There are a number of manufacturers, styles and engineering designs of commercial semi-automated seeders used in the industry. These seeders utilize different technologies, such as air vacuum to pick up the seed and releasing the seed into the tray cell by releasing the seed by air or water pressure.

The current commercial method and process for delivering transplants to watermelon growers includes that the triploid seedless watermelon seeds and the enhanced watermelon pollenizer seeds are grown in separate trays while in the greenhouse. This is considered necessary due to the cultural practices required in the greenhouse to produce healthy and usable seedling plants for transplanting. Prior to the introduction of SP-1 by Syngenta, the diploid seeded watermelon pollenizers then in use would compete for light and space within the tray, thwarting the growth of the triploid seedless watermelon plants. In addition, the number of growing days and nutritional requirements to produce a usable transplant is different for the triploid watermelon plants and the diploid seeded pollenizers. For this reason, all pollenizers continue to be seeded in trays dedicated to the varieties and placed in the greenhouse separate from the seedless varieties and tray as this has always been the common practice.

In the field, watermelon pollenizers are planted in different ratios when planted with the triploid seedless watermelons to ensure that viable pollen is available for the production of the seedless fruit. These ratios widely differ based on the varieties used, the number of plants per acre, plant distance down the row and square feet occupied per plant bed widths, as well as environmental factors during field production. They can be in ratios of 1 seedless plant to 1 pollenizer plant (1:1 ratio) and at times up to 5 seedless plants to 1 pollinator plant (5:1 ratio). The most commonly used ratios are 2:1, 3:1 and 4:1 seedless to seeded pollinator ratios.

These ratios of pollenizers planted greatly affect the commercial greenhouse producer's profitability and efficiencies in transplant production. The trays dedicated to pollenizers take up valuable space in the greenhouse and require different cultural practices within the greenhouse in terms of irrigation and fertility management due to differences in the number of growing days and sowing dates between the seedless and pollenizer varieties. Logistics is also compromised when placing and tagging the pollenizer trays to separate them from the seedless trays in the greenhouse. Pollenizer trays will occupy 20%-50 of the greenhouse space, compromising seedless quantities and assuming a large % of the freight costs.

Commercial greenhouse producers make arrangements with growers for delivery of triploid seedless and pollenizers at specific dates. Most commonly, the watermelon transplants are loaded and placed in racked trailers or boxes for delivery directly to the field location. This involves organized and well managed hand labor to ensure that the triploid seedless trays and seeded pollenizer trays are clearly separated and marked prior to and during the loading operation destined for the grower's field.

Not only are greenhouse logistical costs compromised utilizing the current process and methods but freight and shipping costs are affected due to the space required in the trailer or container for the pollenizer trays. Due to increasing fuel costs associated with delivery of the trays to the field, it is estimated that for every acre of seedless plants delivered to the grower, the additional weight for pollenizers is 50 lbs on the trailer or container. This includes the weight of the tray, and the moist planting media. In addition, for every acre of seedless delivered, pollenizer trays occupy an estimated 14 cubic feet of valuable and expensive space within the trailer or container.

Commercially, watermelon transplants are planted in fields by mechanical transplanting machines, hand labor or a combination of both methods. The pollenizer plant must be planted and placed in the field occupying a dedicated space and at the correct ratio and dispersion in the field to ensure that pollen can be easily transferred utilizing bees to the seedless plants and female flowers to produce the seedless fruit. For mechanical transplanting, this involves specialized equipment setup and a dedicated laborer or effort dedicated to the placement of the pollenizer transplant in the correct position in the field. When using hand labor for transplanting, it involves additional labor and the separation of the crews to ensure the correct ratios are placed in the field.

The introduction to the industry of the SP-1 enhanced watermelon pollenizers provided a unique planting sequence in the field that further complicated field transplanting methods and logistics for the grower. SP-1 and other enhanced watermelon pollenizers do not compete with triploid seedless watermelon varieties for light, space or nutrition. This enabled growers to plant enhanced watermelon pollenizers in a non-dedicated space, i.e., interspersed within the same part of the field as the triploid seedless variety. This change created logistics problems in the field and increased costs associated with the transplantation of watermelon seedlings to the field. For example, transplanting by hand labor requires additional costs associated with the dedicated labor to transplant the enhanced watermelon pollenizer plants in between the seedless plants. This additional cost to the growers is an estimated $50-$60 per acre of seedless watermelons for transplanting enhanced watermelon pollenizers.

SUMMARY OF THE INVENTION

The invention includes a method for mechanically sowing or seeding an enhanced watermelon pollenizer, such as for example SP-1, in the same tray with a triploid seedless watermelon variety.

In one embodiment, the seeds of the triploid seedless watermelon variety and the seeds of the enhanced watermelon pollenizer will be sown in the same tray by the same mechanical seeder, wherein the mechanical seeder has a first and second drum and said first drum contains the seed of the triploid seedless watermelon variety and said second drum contains the seed of the enhanced watermelon pollenizer.

In another embodiment, the seeds of the triploid seedless watermelon variety and the seeds of the enhanced watermelon pollenizer are sown in the same tray by a first and second mechanical seeder, wherein said first mechanical seeder contains the seed of the triploid seedless watermelon variety and said second mechanical seeder contains the seed of the enhanced watermelon pollenizer.

In another embodiment, the seeds of the triploid seedless watermelon variety and the seeds of the enhanced watermelon pollenizer are sown in the same tray as part of a single sowing step by a mechanical seeder, wherein said mechanical seeder contains the seed of the triploid seedless watermelon variety and the seed of the enhanced watermelon pollenizer, wherein the mechanical seeder selectively sows said triploid seed and said enhanced watermelon pollenizer seed in the cells of a tray in a particular pattern and ratio.

The ratio of the enhanced watermelon pollenizer seed placed or dropped into the seedless tray could be any of the seedless/pollenizer ratios commonly used in commercial production of seedless watermelon. The dispersion and number of cells in the seedling tray are dependent on the seedless and/or the enhanced watermelon pollenizer used, ratio sought after, germination loss, vigor of seedlings and environment in which the seedlings will be grown There are multiple advantages to the method of the invention. For example, from the standpoint of a greenhouse, the method of the invention provides the following advantages:
  Saves greenhouse space by 20% (4:1 pollinator ratio) or 25% (3:1 pollenizer ratio) per order (reduces input and material costs and allows for more volume/space in the greenhouse)
  Reduces seeding time by 20 to 25% per order (lower cost and improved efficiency)
  Reduces planting medium cost by 20 to 25% per order (lower cost and less inventory to manage)
  Reduces trays needed to cover order by 20 to 25% per order (lower overhead (H2O, fertilizer and pesticide))
  both seedless and pollenizer (higher return on space in greenhouse)
  Increased plant volume per delivery, thus maximizing freight costs For growers and customers who purchase the young plants and then must plant them in the field, the method of the invention provides additional advantages, including:
  Planting crews do not have to keep enhanced watermelon pollenizer trays separate from triploid seedless watermelon trays; ratios are pre-determined and pre-set.
  Planting process is much easier as the enhanced watermelon pollenizer trays are not separate (i.e. there is no confusion on which trays contain enhanced watermelon pollenizers—planting efficiency improved)
  Planting process is less complicated (lowered requirement for trained crews)
  Fewer trays to transport to the field (improved efficiency & maximizing freight costs to the higher value seedless)
  Planting crews can increase speed or cover more acreage due to fewer plugs being planted in the field (reduced transplanting cost)
  No dedicated crew for hand planting enhanced watermelon pollenizer plants (reduced planting cost)

The use of mechanical seeders for planting seeds in trays is well known in the art. Any mechanical seeder could be used in the method of the invention. A few examples of well known seeders include the Stewart Boots Seeder, offered for sale by SK Designs, Inc. of Ruskin, Fla.; the Hamilton Drum Seeder offered by Hamilton Design, Ltd of the UK; the seeders offered by Williames Pty Ltd of Australia; and the Zeta Drum Seeders offered by Urbinati out of Spain. As aforementioned, any of these seeders as well as any other mechanical seeder could be used to perform the method of the invention.

DETAILED DESCRIPTION

Figure 1:
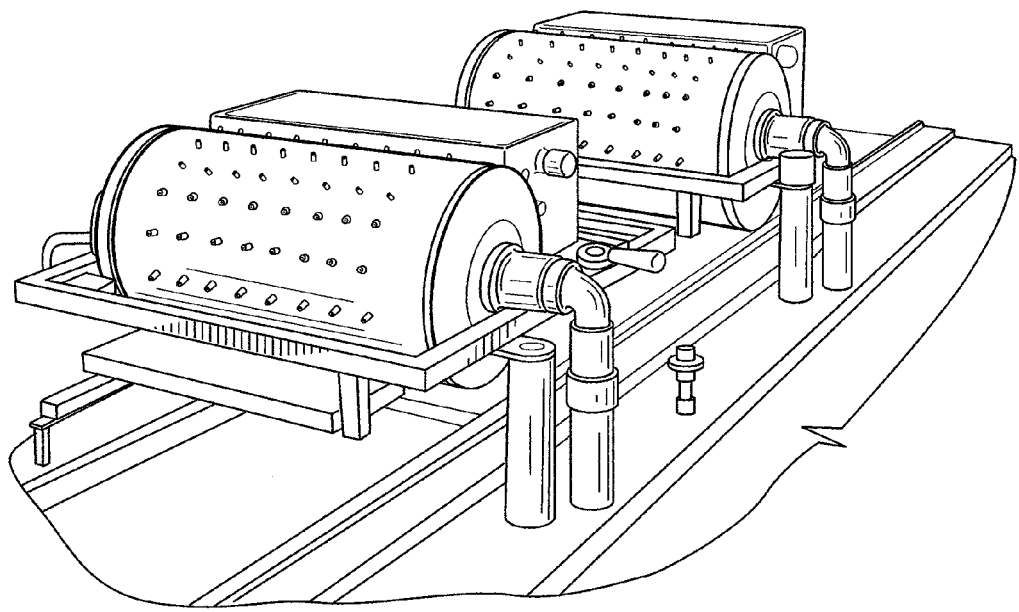
FIG. 1 represents an example of a typical vacuum drum seeder outfitted with two drums.

There are multiple types of mechanical seeders that are currently in use within the agricultural industry for the seeding of seedling trays. Examples of different types of seeders include vacuum drum seeders, cylinder seeders, needle seeders and plate seeders. Any type of mechanical seeder can be used to practice the methods of the invention. The most common type of mechanical seeder used for seeding watermelon seeds are vacuum drum seeders.

Vacuum drum seeders are common in the agricultural industry and their mechanism of operation is well known to any person of ordinary skill in the art. Vacuum drum seeders generally comprise a mounted cylindrical seeding drum that is able to rotate on its axis, wherein the cylindrical seeding drum contains multiple openings on its surface. The cylindrical seeding drum is coupled with a means for supplying a vacuum such that the openings on the surface of the cylindrical seeding drum are capable of holding seeds there-against in a pre-determined seeding pattern when a vacuum is applied. The pre-determined seeding pattern can be changed either by switching the cylindrical seeding drum for another cylindrical seeding drum bearing a different pattern, or by any means which could block the adhesion of a seed to any particular opening. Any pattern that would prove useful for the particular seeding application at hand may be employed. Different cylindrical seeding drums may also contain different sized openings for use with smaller or larger seeds, depending upon the immediate need.

Vacuum drum seeders also normally contain a dibbling apparatus for forming a pre-determined pattern of planting holes in the planting material contained within the cells of a seeding tray to receive seeds from the cylindrical seeding drum. The dibbling apparatus is also mounted so as to rotate. The pre-determined pattern and planting hole size may be interchanged as with the pre-determined pattern on the cylindrical seeding drum for the appropriate seedling tray design and number of cells in the tray.

Additionally, the vacuum drum seeders generally contain a seed hopper which is adapted to hold seeds in surface to surface contact with the cylindrical seeding drum so that the openings may pick up seeds when a vacuum is applied to the cylindrical seeding drum.

Finally, vacuum drum seeders also normally include a conveyor feed for moving the seeding trays beneath the dibbling apparatus and subsequently beneath the cylindrical seeding drum. The rotary dibbler is used to roll over the seeding trays containing a planting medium suitable for growing seedlings. The tray is then carried along on the conveyor to have seeds deposited by the cylindrical seeding drum into the pre-formed holes made by the dibbling apparatus. The rotary motion of the dibbling apparatus and cylindrical seeding drum allow continuous operation to provide smooth operation.

While the conventional configuration for vacuum drum seeders includes only one cylindrical seeding drum, it is known in the art to provide a vacuum drum seeder with two cylindrical seeding drums.

FIG. 1 is a representation of a standard vacuum drum seeder.

Not all vacuum drum seeders known in the industry will be identical to the above description, however, any person of skill in the art would recognize that the above example typifies the functionality of a vacuum drum seeder and that any vacuum drum seeder used in the agricultural industry would function in the methods of the invention.

In general, the method of the invention may be practiced by any vacuum drum seeder used in the industry as well as any other type of mechanical seeder known in the industry. The method of the invention contemplates both a vacuum seeder with two cylindrical seeding drums as well as two separate vacuum drum seeders or two mechanical seeders of any type utilized in serial. If two mechanical seeders or two vacuum drum seeders are utilized, the first mechanical seeder or first vacuum seeder plants either the triploid seedless watermelon seeds or the enhanced watermelon pollenizer seeds in the cells of the seeding tray according to the pre-determined seeding pattern and the second mechanical seeder or second vacuum seeder plants the other type of seeds in the cells of the seeding tray according to the pre-determined seeding pattern. It is also possible to use one mechanical seeder to seed the seedling trays initially with one type of seed, and then change the type of drum head, seedling plates and/or the seed hopper and pass the seeding trays through a second time to seed the second type of seed. Additionally, it would also be possible to develop a new or program an existing mechanical seeder that is capable of dispensing both triploid seedless watermelon seed and enhanced watermelon pollenizer seed. In such an embodiment, the mechanical seeder would contain the seed of the triploid seedless watermelon variety and the seed of the enhanced watermelon pollenizer, and the mechanical seeder would selectively sow the triploid seedless watermelon seed and the enhanced watermelon pollenizer seed in the wells of a tray in a particular pattern and ratio.

Figure 2:
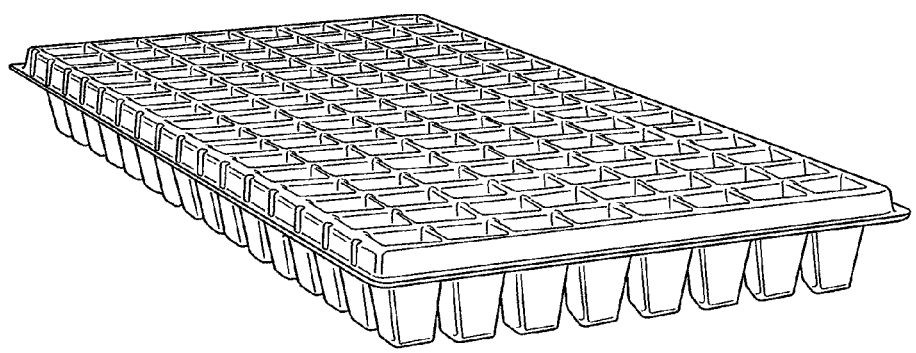
FIG. 2 represents an example of a typical seeding tray.

The seedling trays contemplated by the method of the invention are well known to anyone of ordinary skill in the art, as well as to any person who has every purchased small plants at their local nursery. The seedling trays contemplated by the method of the invention are the standard, pre-formed trays used in nearly all areas of agriculture for sprouting seeds to the seedling stage and may be any seedling tray that is common in the agricultural industry. The number and size of the cells within seedling trays varies widely depending upon the application. The most commonly used seedling trays for the planting of watermelon seeds contain 98, 128 or 162 cells, however, a seedling tray with any number of cells may be used. FIG. 2 is a representation of a standard seedling tray. This seeding tray has 128 cells.

The planting material used within the seedling trays can be any suitable planting material.

The placement pattern of triploid seedless watermelon seeds and enhanced watermelon pollenizer seeds in the seedling trays by the mechanical seeder can be any pattern which maintains the desired ratio of pollenizer seed to triploid seed and distributes the pollenizer seeds evenly throughout the seedling tray. The preferred method of the invention includes seeding each cell in the tray with the triploid seed and then seeding the pollenizer seed second, dispersing the pollenizer seed out within the seedling tray according to the preferred, pre-determined pattern.

The pattern used to determine the cells in which the enhanced watermelon pollenizer is seeded can be based on any methodology that results in a dispersal of the enhanced watermelon pollenizer watermelon seed among the triploid seedless watermelon seeds. For example, the preferred seeding pattern for the enhanced watermelon pollenizer watermelon seed could be in every $2^{nd}$ cell, every $3^{rd}$ cell, every $4^{th}$ cell or every $5^{th}$ cell.

Figure 3:
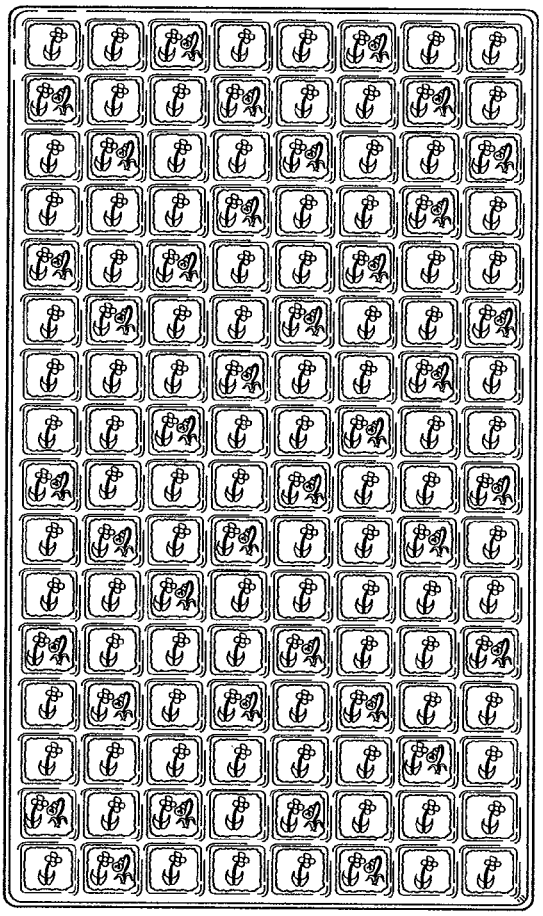
FIG. 3 represents an example of one seeding pattern that could be employed in the method of the invention. Cells of the tray that contain both a triploid seedless watermelon variety seed and an enhanced watermelon pollenizer seed are denoted by two plant icons, while cells of the tray that contain only a triploid seedless watermelon variety seed are denoted by one plant icon.
Figure 4:
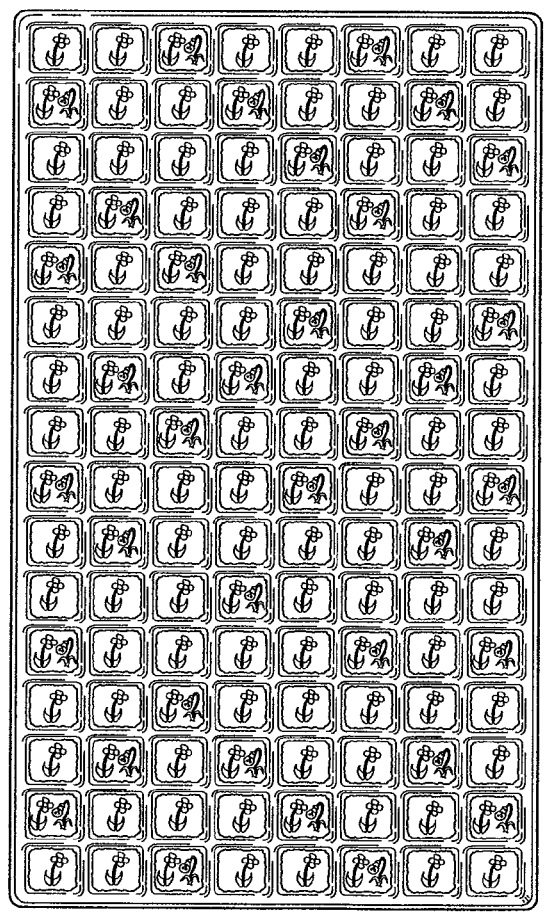
FIG. 4 represents a second example of one seeding pattern that could be employed in the method of the invention.

Typical seedling trays are rectangular in shape and will have a long-side and a short-side. Another example of a pre-determined pattern would be to provide 3, 4, 5 or 6 enhanced watermelon pollenizer seeds in each long-sided row of each seedling tray. Alternatively, the enhanced watermelon pollenizer watermelon seeds could be spread out in differing numbers per long-sided row. For example, if the seedling tray contains 8 long-sided rows, the dedicated watermelon pollenizers could be dispersed by alternating between 4 and 5 enhanced watermelon pollenizer watermelon seeds per row. FIGS. 3 and 4 provide examples of possible enhanced watermelon pollenizer seed dispersal within a 128 cell seeding tray.

There are an infinite number of possibilities for the dispersal of the enhanced watermelon pollenizer seeds within the seedling tray. The above dispersal patterns are provided only as examples and are in no way exhaustive of the possibilities for dispersal of the enhanced watermelon pollenizer watermelon seeds within a seedling tray. The only requirement for the number and dispersal of enhanced watermelon pollenizer watermelon seeds within a seeding tray is that there is a sufficient ratio of enhanced watermelon pollenizer watermelon seeds to triploid watermelon seeds. A sufficient ratio is a ratio that would allow for adequate dispersal of the pollen from the enhanced watermelon pollenizer plants among the triploid seedless watermelon plants when the plants are transplanted to the field. A person of ordinary skill in the art would recognize that this ratio can vary depending upon the type of enhanced watermelon pollenizer used, the type of triploid seedless watermelon used and the environmental conditions present in the field. An example of possible triploid seedless watermelon seed to enhanced watermelon pollenizer watermelon seed ratios would be 1:1 2:1, 3:1, 4:1, 5:1, 6:1, and possibly higher ratios under certain circumstances.

It is also contemplated by the method of the invention that errors during the mechanical seeding of the seedling trays could result due to malfunction of the seeding equipment. Should this occur, it is contemplated by the method that some cells of the seedling tray may need to be seeded by hand to ensure that a proper seedling yield and dispersal is achieved.

Due to the characteristics of enhanced watermelon pollenizers, they are able to be planted within the same tray as triploid seedless watermelon varieties as described above. This is because enhanced watermelon pollenizers have a significantly reduced impact on the growth of the triploid seedless watermelon varieties as compared to past diploid pollenizers, which competed for light, space and nutrients with the triploid seedless watermelon varieties.

The preferred embodiment of the invention contemplates that the enhanced watermelon pollenizer is the enhanced watermelon pollenizer SP-1 offered by Syngenta, or derivatives thereof, such as SP-4. However, any enhanced watermelon pollenizer may be used. An enhanced watermelon pollenizer, as contemplated by the method of the invention, is a watermelon plant that has been bred to display certain characteristics that (1) reduce its ability to interfere and compete with the growth of triploid seedless watermelon plants, both in the tray and in the field, (2) enhance its ability to pollenize female flowers of said triploid seedless watermelon plants, said pollenization resulting in triploid seedless fruit with a distinct phenotype. Examples of such characteristics include small leaves, deeply lobed leaves, lacy vines, small fruit, fruit with a brittle rind, an increased number of male flowers and a longer flowering period. It is not essential for an enhanced pollenizer to contain all of these characteristics. Examples of enhanced pollenizers that contain some of the above characteristics include Sidekick, offered by Harris Moran and Patron, offered by Zeraim Gedara.

In a first preferred embodiment of the invention, a method of sowing watermelon seeds is provided, comprising the steps of (1) providing a mechanical seeder; and (2) using said mechanical seeder to seed a seedling tray with triploid seedless watermelon seed and enhanced watermelon pollenizer seed.

In a further embodiment, the triploid seedless watermelon seed is planted in each cell of the seedling tray.

In another embodiment, the enhanced watermelon pollenizer seed is planted into every $2^{nd}$, $3^{rd}$ or $4^{th}$ cell of the seedling tray.

In another embodiment, the ratio of triploid seedless watermelon seeds to enhanced watermelon pollenizer seeds is 6:1, 5:1, 4:1, 3:1 or 2:1.

In another embodiment, the enhanced watermelon pollenizer seeds are seeds of watermelon pollenizer SP-1 or derivatives thereof.

In another embodiment, the enhanced watermelon pollenizer seeds are seeds of watermelon pollenizer Sidekick.

In another embodiment, the mechanical seeder provided in the method is a vacuum drum seeder.

In a further embodiment, the provided vacuum drum seeder comprises two cylindrical seeding drums, wherein one drum seeds the seedling tray with triploid seedless watermelon seed and the other drum seeds the seedling tray with enhanced watermelon pollenizer seed.

In a second preferred embodiment of the invention, a method of sowing watermelon seeds is provided, comprising the steps of (1) providing a first mechanical seeder; (2) providing a second mechanical seeder; and (3) using said first mechanical seeder to seed a seedling tray with either triploid seedless watermelon seed or enhanced watermelon pollenizer seed and using said second mechanical seeder to seed with whichever type of seed was not seeded by said first mechanical seeder.

In a further embodiment, the triploid seedless watermelon seed is planted in each cell of the seeding tray.

In another embodiment, the enhanced watermelon pollenizer seed is planted into every $2^{nd}$, $3^{rd}$ or $4^{th}$ cell of the seeding tray.

In another embodiment, the ratio of triploid seedless watermelon seeds to enhanced watermelon pollenizer seeds is 6:1, 5:1, 4:1, 3:1 or 2:1.

In another embodiment, the enhanced watermelon pollenizer seeds are seeds of watermelon pollenizer SP-1 or derivatives thereof.

In another embodiment, the enhanced watermelon pollenizer seeds are seeds of watermelon pollenizer Sidekick.

In another embodiment, the first mechanical seeder is selected from the group comprising: (1) a vacuum drum seeder; (2) a needle seeder; (3) a plate seeder; and (4) a cylinder seeder, and the second mechanical seeder is selected from the group comprising: (1) a vacuum drum seeder; (2) a needle seeder; (3) a plate seeder; and (4) a cylinder seeder.

In a further embodiment, the first and second mechanical seeders are the same type of mechanical seeder.

In another embodiment, the first and second mechanical seeders are different types of mechanical seeders.

In a further embodiment, in any of the above embodiments, an additional step is performed wherein the accuracy of the mechanical seeder or mechanical seeders is inspected and any errors in seeding by the mechanical seeder or mechanical seeders are corrected through hand-sowing.

In another embodiment, the seeds of the triploid seedless watermelon variety and the seeds of the enhanced watermelon pollenizer are sown in the same seedling tray as part of a single sowing step by a mechanical seeder, wherein said mechanical seeder contains the seed of the triploid seedless watermelon variety and the seed of the enhanced watermelon pollenizer, wherein the mechanical seeder selectively sows said triploid and said watermelon pollenizer into a the wells of a tray in a particular pattern and ratio.

It should be appreciated by those of ordinary skill in the art that the embodiments disclosed above and the methods for seeding and possible patterning and dispersal of seeds within the seedling trays represent embodiments developed by the inventors to function well in the practice of the method of the invention and thus can be considered to constitute preferred modes for its practice. However, those of ordinary skill in the art should, in light of the present disclosure, appreciate that many changes can be made in the specific embodiments which are disclosed and still obtain a like or similar result without departing from the spirit and scope of the invention.

The invention claimed is:

1. A method of sowing watermelon seeds, comprising:
   a. providing a first mechanical seeder;
   b. providing a second mechanical seeder; and
   c. using said first mechanical seeder to seed a seedling tray with either triploid seedless watermelon seed or enhanced watermelon pollenizer seed and using said second mechanical seeder to seed with whichever type of seed was not seeded by said first mechanical seeder in the same seedling tray.

2. The method of claim 1, wherein the triploid watermelon seeds are seeded in each cell of the seedling tray.

3. The method of claim 1, wherein the triploid watermelon seeds and enhanced watermelon pollenizer seeds are planted in a sufficient ratio of enhanced watermelon pollenizer seeds to triploid watermelon seeds.

4. The method of claim 3, wherein the triploid watermelon seeds and enhanced watermelon pollenizer seeds are planted in a ratio of 6:1, 5:1, 4:1, 3:1 or 2:1, triploid to pollenizer.

5. The method of claim 1, wherein the dedicated watermelon pollenizer seeds are planted in every $2^{nd}$, every $3^{rd}$, every $4^{th}$ or every $5^{th}$ cell of the seeding tray.

6. The method of claim 1, wherein the enhanced watermelon pollenizer seeds are seeds of watermelon pollenizer plant Sidekick.

7. The method of claim 1, wherein the enhanced watermelon pollenizer seeds are seeds of watermelon pollenizer plant SP-1 and derivatives thereof.

8. The method of claim 1, wherein the first mechanical seeder is selected from the group comprising: (1) a vacuum drum seeder; (2) a needle seeder; (3) a plate seeder; and (4) a cylinder seeder, and the second mechanical seeder is selected from the group comprising: (1) a vacuum drum seeder; (2) a needle seeder; (3) a plate seeder; and (4) a cylinder seeder.

9. The method of claim 8, wherein the first and second mechanical seeders are the same type of mechanical seeder.

10. The method of claim 8, wherein the first and second mechanical seeders are different types of mechanical seeders.

11. The method of claim 1, comprising the further step of assessing the accuracy of the mechanical seeders' placement of the triploid watermelon seeds and the enhanced watermelon pollenizer watermelon seeds and correcting any errors through hand-sowing.

* * * * *